US010079996B2

(12) United States Patent
Takahashi et al.

(10) Patent No.: US 10,079,996 B2
(45) Date of Patent: Sep. 18, 2018

(54) COMMUNICATION SYSTEM, COMMUNICATION DEVICE, AND COMMUNICATION METHOD

(71) Applicants: Masato Takahashi, Tokyo (JP); Koji Kuwata, Kanagawa (JP); Kiyoto Igarashi, Kanagawa (JP); Tomoyuki Goto, Kanagawa (JP); Kazuki Kitazawa, Kanagawa (JP); Nobumasa Gingawa, Kanagawa (JP); Miku Hakamatani, Kanagawa (JP)

(72) Inventors: Masato Takahashi, Tokyo (JP); Koji Kuwata, Kanagawa (JP); Kiyoto Igarashi, Kanagawa (JP); Tomoyuki Goto, Kanagawa (JP); Kazuki Kitazawa, Kanagawa (JP); Nobumasa Gingawa, Kanagawa (JP); Miku Hakamatani, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 7 days.

(21) Appl. No.: 15/297,558

(22) Filed: Oct. 19, 2016

(65) Prior Publication Data

US 2017/0127020 A1    May 4, 2017

(30) Foreign Application Priority Data

Oct. 28, 2015   (JP) .................................. 2015-212266

(51) Int. Cl.
*H04N 7/14*    (2006.01)
*H04N 7/15*    (2006.01)
(Continued)

(52) U.S. Cl.
CPC ........... *H04N 7/15* (2013.01); *H04N 5/23238* (2013.01); *H04N 7/142* (2013.01); *H04R 1/406* (2013.01);
(Continued)

(58) Field of Classification Search
CPC . G06F 3/03545; H04R 1/406; H04R 2430/21; H04N 5/23238; H04N 5/2628; H04N 9/3188
(Continued)

(56) References Cited

U.S. PATENT DOCUMENTS 6,429,856 B1    8/2002  Omura et al.
8,007,111 B2 *  8/2011  Kojima ................ H04N 9/3188
                                              353/28
(Continued)

FOREIGN PATENT DOCUMENTS

JP   2007-274463   10/2007

*Primary Examiner* — Hemant Patel
(74) *Attorney, Agent, or Firm* — Cooper & Dunham LLP (57) ABSTRACT

A device performs to: generate second correspondence information indicating a correspondence relation between coordinates of a projection area and coordinates of a captured image based on first correspondence information indicating a size of the projection area indicating an area to which an image is projected by an image projection device, a size of a basic area indicating an area predetermined as the area to which the image is projected, and indicating a correspondence relation between the coordinates of the basic area and the coordinates of the captured image obtained by an imaging unit; transmit coordinate information indicating a range, of the projection area, specified by a user and the second correspondence information to other device; and output, when receiving output information including voice whose directivity is controlled according to an area corresponding to the coordinate information of the captured image from the other device, the received output information.

9 Claims, 9 Drawing Sheets

(51) Int. Cl.
*H04N 5/232* (2006.01)
*H04R 1/40* (2006.01)
*G06F 3/0354* (2013.01)
*H04N 5/262* (2006.01)
*H04N 9/31* (2006.01)

(52) U.S. Cl.
CPC ........ *G06F 3/03545* (2013.01); *H04N 5/2628* (2013.01); *H04N 9/3188* (2013.01); *H04R 2430/21* (2013.01)

(58) Field of Classification Search
USPC .......................................... 348/14.01–14.16
See application file for complete search history.

(56) References Cited

U.S. PATENT DOCUMENTS

| | | | |
|---|---|---|---|
| 2006/0192847 A1* | 8/2006 | Watanabe | H04N 7/142 348/14.07 |
| 2011/0109554 A1* | 5/2011 | Boissier | G06F 3/03545 345/166 |
| 2012/0274733 A1 | 11/2012 | Yano | |
| 2014/0376740 A1 | 12/2014 | Shigenaga et al. | |
| 2015/0054791 A1 | 2/2015 | Omura | |
| 2015/0109401 A1 | 4/2015 | Kasatani et al. | |
| 2015/0146095 A1 | 5/2015 | Yano | |

* cited by examiner

COMMUNICATION SYSTEM, COMMUNICATION DEVICE, AND COMMUNICATION METHOD

CROSS-REFERENCE TO RELATED APPLICATIONS

The present application claims priority under 35 U.S.C. § 119 to Japanese Patent Application No. 2015-212266, filed Oct. 28, 2015. The contents of which are incorporated herein by reference in their entirety.

BACKGROUND OF THE INVENTION

1. Field of the Invention

The present invention relates to a communication system, a communication device, and a communication method.

2. Description of the Related Art

As a form of a communication system for transmitting and receiving data among a plurality of communication devices, a video (TV) conference system is known in which a remote conference is achieved by using a communication network. In the video conference system, it is possible to carry out a meeting between remote places in a state close to an actual meeting at a conference room where one side of parties such as participants carries out the remote conference by converting an image of a participant etc. at the conference room and voice such as his/her speech into digital data using a communication device (terminal device) of a remote video conference system, transmitting the digital data to a communication device of the other party, and by displaying the image on a display in a conference room of the other party and outputting the voice from a speaker.

In such a video conference system, a microphone is used to capture the voice of the participants in the meeting and a camera is used to capture an image. Because the camera has an angle of view, an image of a participant in the meeting outside the angle of view of the camera cannot be captured. To solve the problem, it is known a method of using a panoramic camera capable of capturing full 360-degree panoramic images. On the other hand, because a normal microphone is omnidirectional, ambient sounds other than the speech of the participant may also be collected. To solve the problem, it is known a method of suppressing collection of ambient sounds and making clear the speech of the participant by using a microphone array to give directivity to a range of collecting sounds of the microphones. For example, Japanese Unexamined Patent Application Publication No. 2007-274463 discloses a method in which a conference terminal shapes a sound collecting beam of a microphone array according to an arrangement pattern of selected participants. Japanese Patent No. 5028944 discloses a technology of using a microphone array configured to arrange a plurality of microphones to detect a direction of a speaker and follow a capturing direction of a camera to the direction.

A method of achieving a more realistic video conference is conceivable by capturing the entire conference room with the panoramic camera in combination of the panoramic camera and the microphone array and directing, when there is a speaker, a sound collecting range of the microphone toward at least the speaker. However, this combination can direct the sound collecting range of the microphone toward the speaker, but there may be a case where an output focusing the speaker is not desired in the communication device of the other party. Therefore, there is a problem that the combination does not allow each of communication devices that constitute the communication system to perform an intended output.

SUMMARY OF THE INVENTION

According to one aspect of the present invention, there is provided a communication system including: a first communication device, and a second communication device configured to transmit and receive data to and from the first communication device, wherein the first communication device is configured to include: a generating unit configured to generate second correspondence information indicating a correspondence relation between coordinates of a projection area and coordinates of a captured image based on first correspondence information indicating a size of the projection area indicating an area, of a projection plane, to which an image is actually projected by an image projection device connected to the first communication device, a size of a basic area, of the projection plane, indicating an area predetermined as the area to which the image is projected, and indicating a correspondence relation between the coordinates of the basic area and the coordinates of the captured image obtained through capturing by an imaging unit; a first transmission controller configured to perform control to transmit coordinate information indicating a range, of the projection area, specified by a user and the second correspondence information to the second communication device; and an output controller configured to perform control to output, when receiving output information including voice whose directivity is controlled according to an area corresponding to the coordinate information of the captured image from the second communication device, the received output information, and the second communication device is configured to include: an acquiring unit configured to acquire the captured image obtained through capturing by the imaging unit configured to capture surrounding of the second communication device; a specifying unit configured to specify, when receiving the coordinate information and the second correspondence information from the first communication device, an area corresponding to the coordinate information, of the captured image acquired by the acquiring unit, based on the received coordinate information and the second correspondence information; a directivity controller configured to control a directivity of a microphone array including a plurality of microphones so as to direct the directivity to a microphone corresponding to the area specified by the specifying unit among the microphones installed in the second communication device; and a second transmission controller configured to perform control to transmit the output information including at least voice whose directivity is controlled by the directivity controller to the first communication device.

According to another aspect of the present invention, there is provided a communication device including: a generating unit configured to generate second correspondence information indicating a correspondence relation between coordinates of a projection area and coordinates of a captured image based on first correspondence information indicating a size of the projection area indicating an area, of a projection plane, to which an image is actually projected by an image projection device connected to the communication device, a size of a basic area, of the projection plane, indicating an area predetermined as the area to which the image is projected, and indicating a correspondence relation between the coordinates of the basic area and the coordinates of the captured image obtained through capturing by an imaging unit; a transmission controller configured to perform control to transmit coordinate information indicating a range, of the projection area, specified by a user and the second correspondence information to other communication device configured to communicate with the communication device; and an output controller configured to perform control to output, when receiving output information including voice whose directivity is controlled according to an area corresponding to the coordinate information of the captured image from the other communication device, the received output information.

According to still another aspect of the present invention, there is provided a communication method performed by a communication system configured to include a first communication device, and a second communication device configured to transmit and receive data to and from the first communication device, the communication method including: in the first communication device, generating second correspondence information indicating a correspondence relation between coordinates of a projection area and coordinates of a captured image based on first correspondence information indicating a size of the projection area indicating an area, of a projection plane, to which an image is actually projected by an image projection device connected to the first communication device, a size of a basic area, of the projection plane, indicating an area predetermined as the area to which the image is projected, and indicating a correspondence relation between the coordinates of the basic area and the coordinates of the captured image obtained through capturing by an imaging unit; performing control to transmit coordinate information indicating a range, of the projection area, specified by a user and the second correspondence information to the second communication device; and performing control to output, when receiving output information including voice whose directivity is controlled according to an area corresponding to the coordinate information of the captured image from the second communication device, the received output information, and in the second communication device, acquiring the captured image obtained through capturing by the imaging unit configured to capture surrounding of the second communication device; specifying, when receiving the coordinate information and the second correspondence information from the first communication device, an area corresponding to the coordinate information of the captured image acquired at the acquiring based on the received coordinate information and the second correspondence information; controlling a directivity of a microphone array including a plurality of microphones so as to direct the directivity to a microphone corresponding to the area specified at the specifying among the microphones installed in the second communication device; and performing control to transmit the output information including the voice whose directivity is controlled at the controlling to the first communication device.

According to still another aspect of the present invention, there is provided a communication method performed by a communication device including: generating second correspondence information indicating a correspondence relation between coordinates of a projection area and coordinates of a captured image based on first correspondence information indicating a size of the projection area indicating an area, of a projection plane, to which an image is actually projected by an image projection device connected to the communication device, a size of a basic area, of the projection plane, indicating an area predetermined as the area to which the image is projected, and indicating a correspondence relation between the coordinates of the basic area and the coordinates of the captured image obtained through capturing by an imaging unit; performing control to transmit coordinate information indicating a range, of the projection area, specified by a user and the second correspondence information to other communication device configured to communicate with the communication device; and performing control to output, when receiving output information including voice whose directivity is controlled according to an area corresponding to the coordinate information of the captured image from the other communication device, the received output information.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

The present invention has an object to provide a communication system, a communication device, and a communication method capable of performing an intended output.

Exemplary embodiments of a communication system, a communication device, a communication method, and a program according to the present invention will be explained in detail below with reference to the accompanying drawings.

Figure 1:
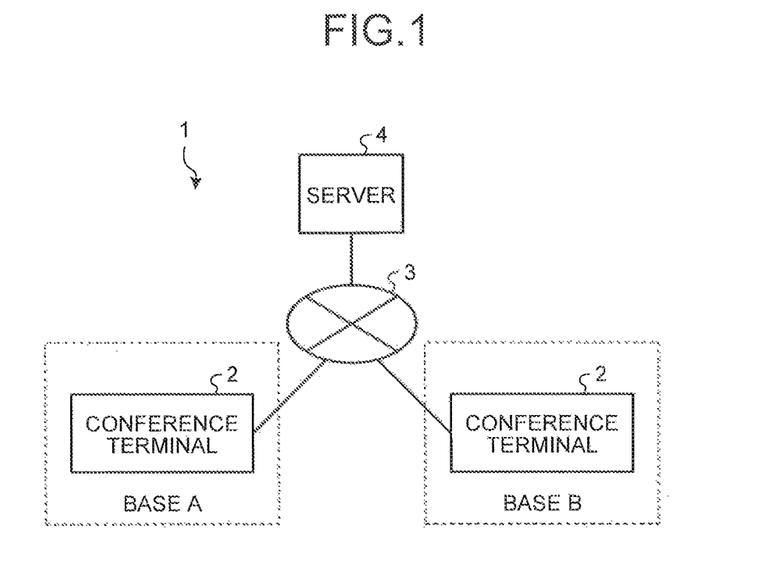
FIG. 1 is a diagram illustrating a configuration example of a communication system.

FIG. 1 is a diagram illustrating a configuration example of a communication system 1 according to a present embodiment. In the example of FIG. 1, a conference terminal 2, which is an example of the communication device, is provided in a base A and a base B one by one. The conference terminals 2 respectively provided in the base A and in the base B are connected to a server 4 via a network 3 such as the Internet. The configuration is not limited thereto, and the number of conference terminals 2 (the number of bases) included in the communication system 1 can be arbitrarily changed.

The server 4 monitors whether each conference terminal 2 is connected with the server 4, and performs control required for a meeting such as a call control of the conference terminal 2 upon a start of the meeting. The conference terminal 2 during the meeting transmits image and voice data to the server 4 at the time of data transmission of its own device, and the server 4 transmits the image and voice data to other conference terminal 2 of the other party. Upon reception of data, the conference terminal 2 receives the image and voice data of the other conference terminal 2 of the other party via the server 4. For example, when a meeting is held between the base A and the base B, the data transmitted by the conference terminal 2 of the base A is transmitted to the conference terminal 2 of the base B via the server 4, but is not transmitted to other conference terminals 2 (conference terminals 2 which do not participate in the meeting). Likewise, the data transmitted by the conference terminal 2 of the base B is transmitted to the conference terminal 2 of the base A which participates in the meeting via the server 4, but is not transmitted to other conference terminals 2 which do not participate in the meeting. By performing the control, it is possible to conduct a meeting between a plurality of conference terminals 2 (between a plurality of bases).

Figure 2:
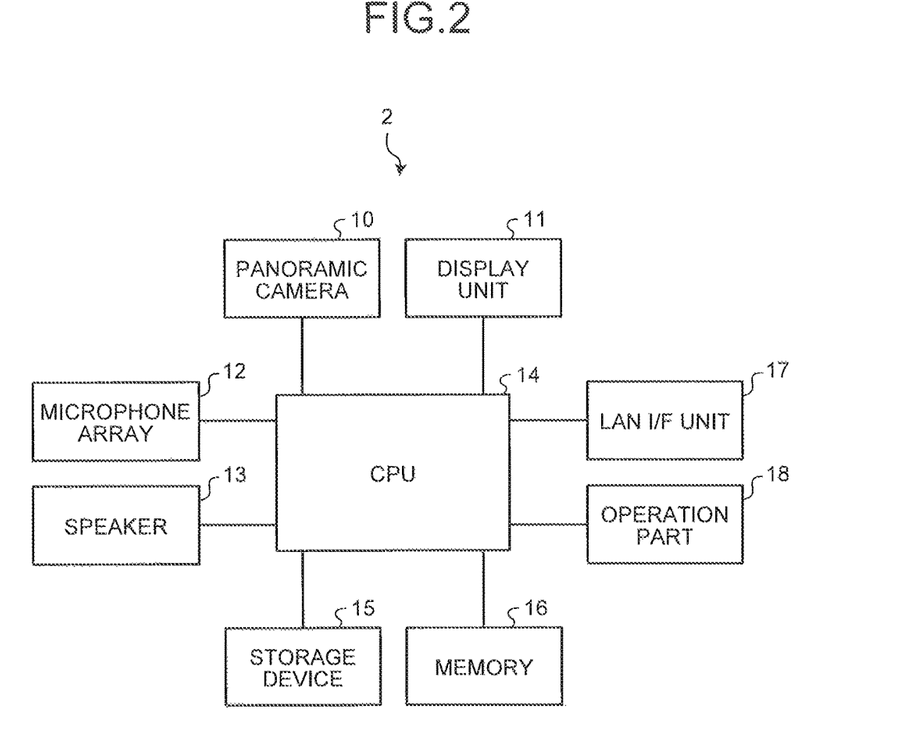
FIG. 2 is a diagram illustrating an example of a hardware configuration of a conference terminal.

A configuration of the conference terminal 2 will be explained next. Because configurations of the conference terminals 2 respectively provided in the base A and the base B are the same as each other, one conference terminal 2 will be explained below as an example. FIG. 2 is a diagram illustrating an example of a hardware configuration of the conference terminal 2. As illustrated in FIG. 2, the conference terminal 2 includes a panoramic camera 10, a display unit 11, a microphone array 12, a speaker 13, a central processing unit (CPU) 14, a storage device 15, a memory 16, a local area network (LAN) interface (I/F) unit 17, and an operation part 18.

The panoramic camera 10 is an example of an "imaging unit", which generates a captured image obtained by the capturing. In this example, the panoramic camera 10 generates a panoramic image (an example of a captured image) obtained by capturing 360 degrees around the panoramic camera 10 (it may be considered to be 360 degrees around the conference terminal 2) and transmits the generated panoramic image to the CPU 14. For example, the panoramic camera 10 includes a known omnidirectional camera or the like. By capturing 360 degrees around the panoramic camera 10, a captured image in which all the meeting participants around the panoramic camera 10 are reflected can be generated. The panoramic image means an image generated by synthesizing a plurality of images (captured images) by capturing the images by using a camera that includes a plurality of imaging elements, by moving one camera, or by using a plurality of cameras. In this example, an area captured by the panoramic camera 10 is set to 360 degrees around the panoramic camera 10, however, the area may be narrower.

The display unit 11 has a function of displaying video data received from the CPU 14 on a screen. In this example, the display unit 11 includes a liquid crystal display device or the like.

The microphone array 12 includes a plurality of microphones separately installed in the conference terminal 2, and has a function of capturing voice of a meeting participant and transmitting the voice to the CPU 14. The microphone array includes a plurality of omnidirectional microphones, and forms a directivity by a beamformer. Generally, the beamformer is a technique for forming a directivity by using a time difference between sounds reaching the microphones. The directivity formed by the beamformer can be freely directed in a vertical direction and a horizontal direction depending on the arrangement of the microphones. Therefore, an area (destination area) where sound is desired to be collected can be arbitrarily changed.

Figure 3:
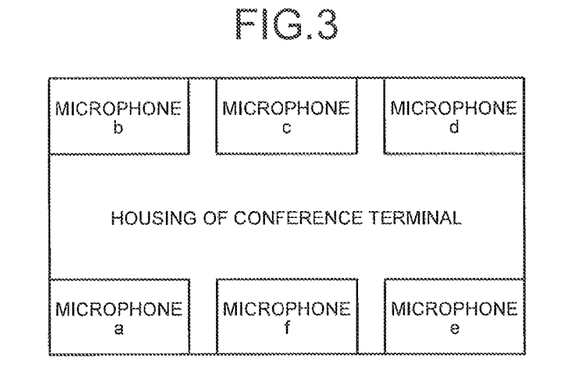
FIG. 3 is a diagram illustrating an arrangement example of microphones.

FIG. 3 is a diagram illustrating an example in which six microphones: microphone a to microphone f included in the microphone array 12 are arranged in a housing of the conference terminal 2. The CPU 14 can collect sounds in an arbitrary range by switching valid/invalid of each microphone and integrating sounds of the microphones. A correspondence relation between each microphone and its installation point in the housing of the conference terminal 2 is previously stored in the storage device 15 of the conference terminal 2.

The description of FIG. 2 is continued. The speaker 13 has a function of outputting the voice data received from the CPU 14. The CPU 14 integrally controls the operations of the entire conference terminal 2. For example, the CPU 14 includes a function of controlling a video conference, a coder-decoder (CODEC) function of encoding the video acquired from the panoramic camera 10 and the voice data acquired from the microphone array 12 to be transmitted to the LAN I/F unit 17 and decoding the video and voice data on the other party side in the meeting received by the LAN I/F unit 17 to be transmitted to the display unit 11 and the speaker 13, and the like. Examples of CODEC used by the CPU 14 include, but are not limited to, H. 264/AVC (Advanced Video Coding) and H. 264/SVC (Scalable Video Coding). Moreover, the CPU 14 includes a function of controlling the directivity of the microphone array 12, a function of displaying a close-up of a speaker among the meeting participants reflected in the panoramic image acquired from the panoramic camera 10, and the like.

The storage device 15 stores programs for various controls (controls for a video conference, etc.) executed by the CPU 14 and conversion tables, explained later, and the like. Examples of the storage device 15 include, but are not limited to, a nonvolatile storage medium such as a flash memory and a hard disk drive (HDD).

The memory 16 loads a program to be executed by the CPU 14 and temporarily stores operation data. Examples of the memory 16 include, but are not limited to, a volatile memory such as a double data rate (DDR) memory. The LAN I/F unit 17 connects to other conference terminal 2 via the network 3 to transmit and receive data (image and voice data). The LAN I/F unit 17 corresponds to 10Base-T, 100Base-TX, and 1000Base-T, and examples of the LAN I/F include, but are not limited to, a wired LAN connecting to Ethernet (registered trademark) and a wireless LAN corresponding to 802. 11a/b/g/n/ac.

The operation part 18 is a device used for various operations (various operations for device control of the conference terminal 2) performed by a user, and includes, for example, a keyboard and a button.

Figure 4:
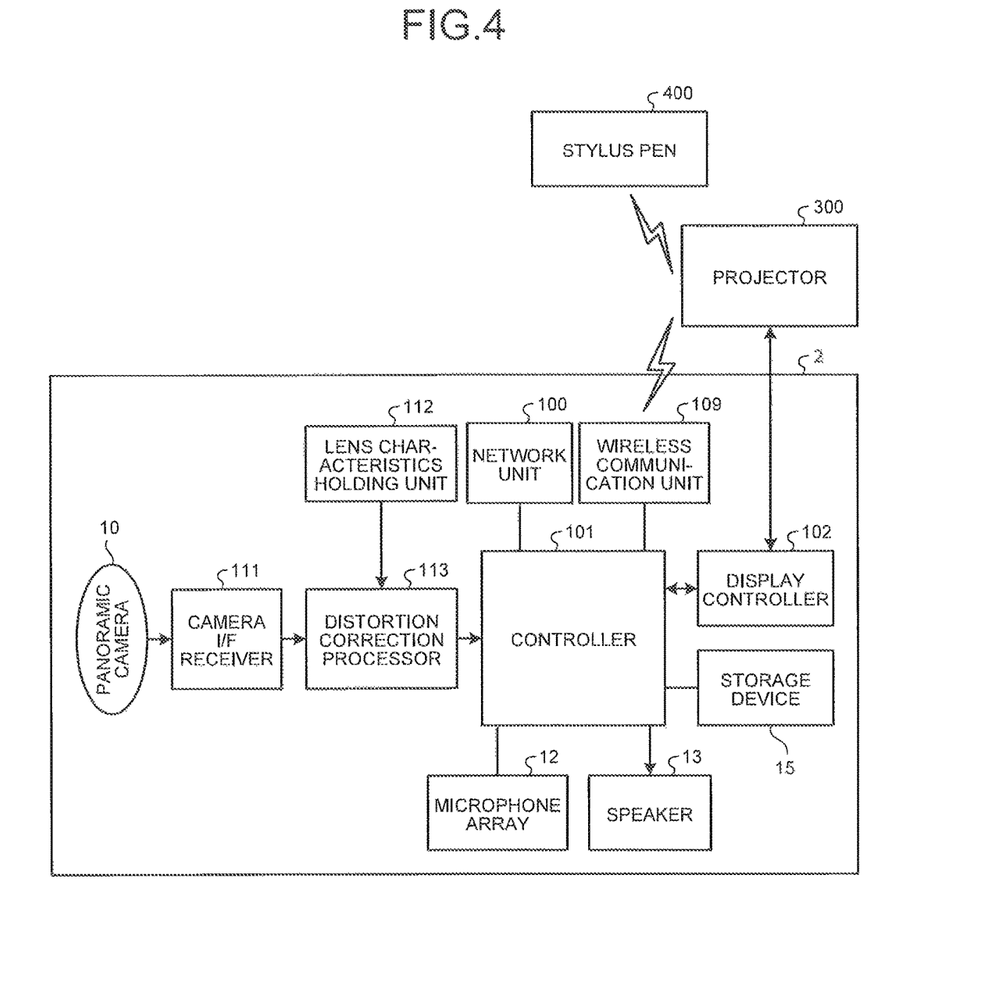
FIG. 4 is a diagram for explaining details of the conference terminal.

FIG. 4 is a diagram for explaining details of the conference terminal 2. The conference terminal 2 is connected to a projector 300 as an example of an "image projection device". The projector 300 has a function of projecting an image input from the conference terminal 2 to a projection plane (e.g., screen) provided in the base where the projector 300 is placed. The projector 300 is capable of inputting various operations (a point operation, a click operation, and a scroll operation, etc.), so-called an interactive operation by using a specific wireless interactive pen (dedicated stylus pen) to directly operate an area of the projection plane where the image is projected. In TI DLP interactive projector, the projector always recognizes a position on the projection plane pointed by the dedicated stylus pen based on a system that is built into projection beam and is capable of managing the position in its own pixel level, and therefore the projector has characteristics such that there is no need to perform calibration upon activation and the calibration is not needed even if the projector moves. In the present embodiment, the projector 300 corresponding to the system and a dedicated stylus pen 400 are used.

The projector 300 has a function of performing wireless communication with the stylus pen 400 and each of the conference terminals 2, and the stylus pen 400 has a function of performing wireless communication with the projector 300. By performing wireless communication with the stylus pen 400, the projector 300 can acquire information indicating a position on the projection plane pointed by the stylus pen 400 from the stylus pen 400, and can therefore always recognize the position on the projection plane pointed by the stylus pen 400 (it can be considered that the position is indicated by the user). By performing wireless communication with the projector 300, the conference terminal 2 can also always recognize the position on the projection plane pointed by the stylus pen 400.

In this example, a combination of the projector 300 and the dedicated stylus pen 400 is provided at the base A and the base B one by one, which has the same configuration.

As illustrated in FIG. 4, the conference terminal 2 includes a network unit 100, a controller 101, a display controller 102, a wireless communication unit 109, a camera I/F receiver 111, a lens characteristics holding unit 112, and a distortion correction processor 113, in addition to the panoramic camera 10, the microphone array 12, the speaker 13, and the storage device 15. Each of functions of the network unit 100, the controller 101, the display controller 102, the wireless communication unit 109, the camera I/F receiver ill, the distortion correction processor 113 may be implemented by the CPU 14 executing the program stored in the storage device 15 or the like, or at least part of the functions may be implemented by a dedicated hardware circuit (semiconductor integrated circuit etc.). For example, the lens characteristics holding unit 112 may be implemented by the storage device 15.

The network unit 100 transmits and receives data to and from other conference terminal 2 as the other party in the meeting.

The controller 101 is a section for performing various controls and operations. Details of the functions of the controller 101 will be explained later.

The display controller 102 has a function of controlling display (projection of an image to the projection plane) by the projector 300.

The wireless communication unit 109 performs wireless communication with the projector 300, and acquires position information indicating a position on the projection plane pointed by the dedicated stylus pen 400 from the projector 300. The wireless communication unit 109 can notify the controller 101 of the position information acquired from the projector 300.

The panoramic image generated by the panoramic camera 10 is transmitted to the camera I/F receiver 111. The camera I/F receiver 111 is assumed to use high speed serial I/F such as VbyOne (registered trademark) and HDMI (registered trademark). A distortion of the panoramic image serial-parallel converted by the camera I/F receiver 111 is corrected by the distortion correction processor 113 and the corrected panoramic image is output to the controller 101. The lens characteristics holding unit 112 stores conversion parameters for distortion correction according to lens characteristics, and the distortion correction processor 113 can correct the distortion of the panoramic image by using the conversion parameters.

Figure 5:
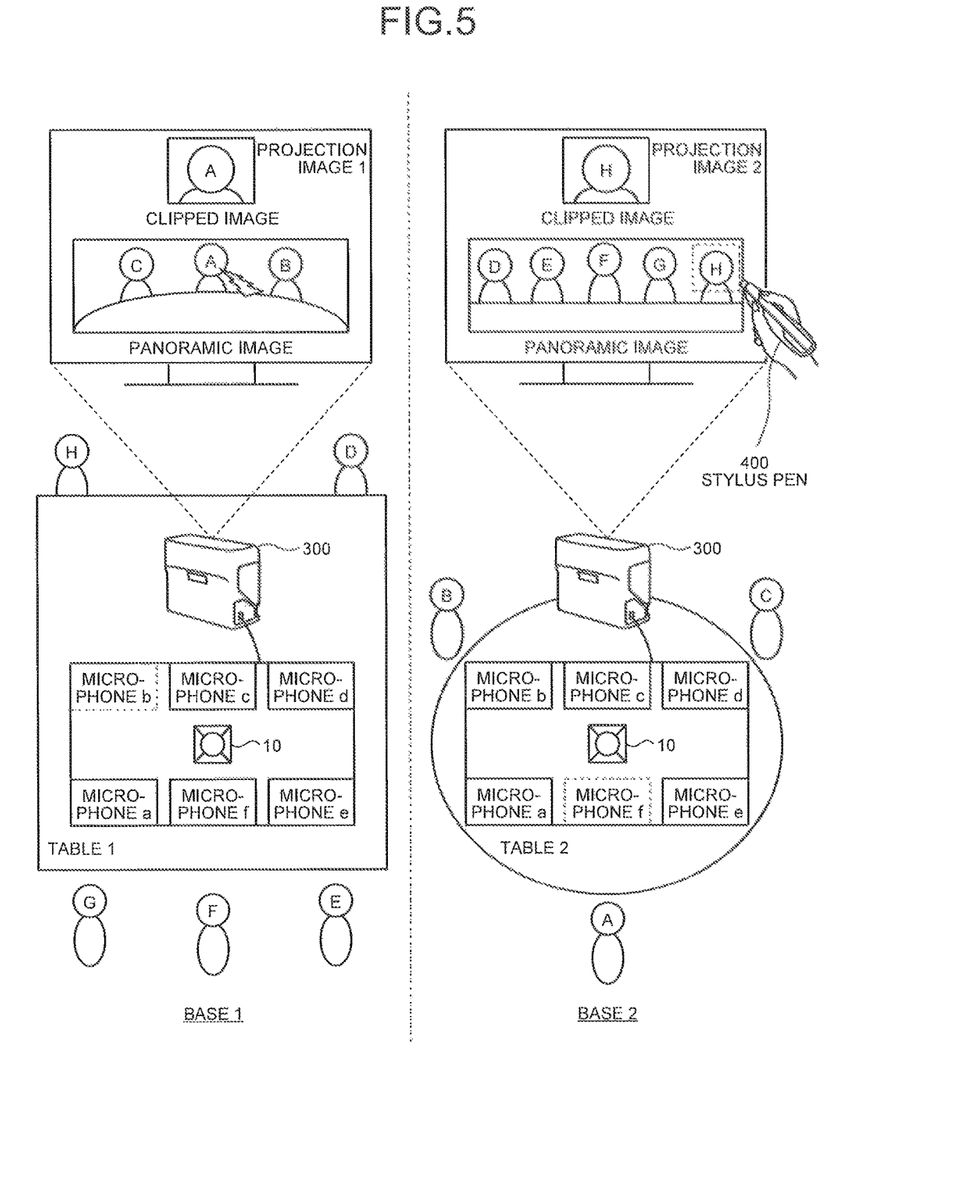
FIG. 5 is a schematic diagram illustrating an example of a situation of video conference according to an embodiment.

FIG. 5 is a schematic diagram illustrating an example of a situation of video conference according to the present embodiment. In a base 1, the conference terminal 2 is placed on a table. Because the conference terminal 2 includes the panoramic camera 10, it is assumed to be placed in the center of the table. As explained above, the conference terminal 2 is provided with the microphone array 12 including the microphone a to the microphone f. The base 1 represents that five persons D to H are participating in the video conference. The projector 300 is connected to the conference terminal 2 placed in the base 1 via a video output cable, an image including a panoramic image on a base 2 side (an image in which the base 2 side-panoramic image is displayed) is projected to the projection plane. In the description herein below, an image projected to the projection plane in the base 1 is called "projection image 1", and an image projected to the projection plane in the base 2 is called "projection image 2". When both of the images are not specifically distinguished from each other, they are simply called "projection image". A panoramic image in which all the persons (persons A to C in this example) participating in the meeting in the base 2 are reflected is displayed in a lower part of the projection image 1. A clipped image obtained by enlarging the person A as a speaker is displayed in an upper part of the projection image 1. In a case of a video conference system including a normal speaker-following function, when any of the meeting participants speaks, a close-up of the speaker is displayed in the clipped image.

In the base 2 also, the conference terminal 2 is placed on a table. Similarly to the base 1, because the conference terminal 2 includes the panoramic camera 10, the conference terminal 2 is assumed to be placed in the center of the table, and is provided with the microphone array 12 including the microphone a to the microphone f. The base 2 represents that three persons A to C are participating in the video conference. Similarly to the base 1, the projector 300 is connected to the conference terminal 2 placed in the base 2 via a video output cable, an image including a panoramic image on the base 1 side (an image in which the base 1 side-panoramic image is displayed) is projected to the projection plane. A panoramic image in which all the persons (persons D to H in this example) participating in the meeting in the base 1 are reflected is displayed in a lower part of the projection image 2. Generally, a speaker is displayed in a clipped image. However, for example, as illustrated in FIG. 5, when any one of the participants in the meeting in the base 2 uses the stylus pen 400 to specify an area surrounded by a dotted line, the voice whose directivity is controlled according to the specified area is output and the image of the specified area is displayed on the projection image 2 as the clipped image. In other words, by specifying the area in which a person desired to be closed up is reflected among the meeting participants reflected in the panoramic image, an output focused on the specified area is possible. In also a case of anything other than persons, by specifying an area in which a target subject is reflected among subjects reflected in the panoramic image, an output focused on the specified area is possible. The configuration (functions of the controller 101) of the conference terminal 2 to implement the operation will be explained later.

Figure 6:
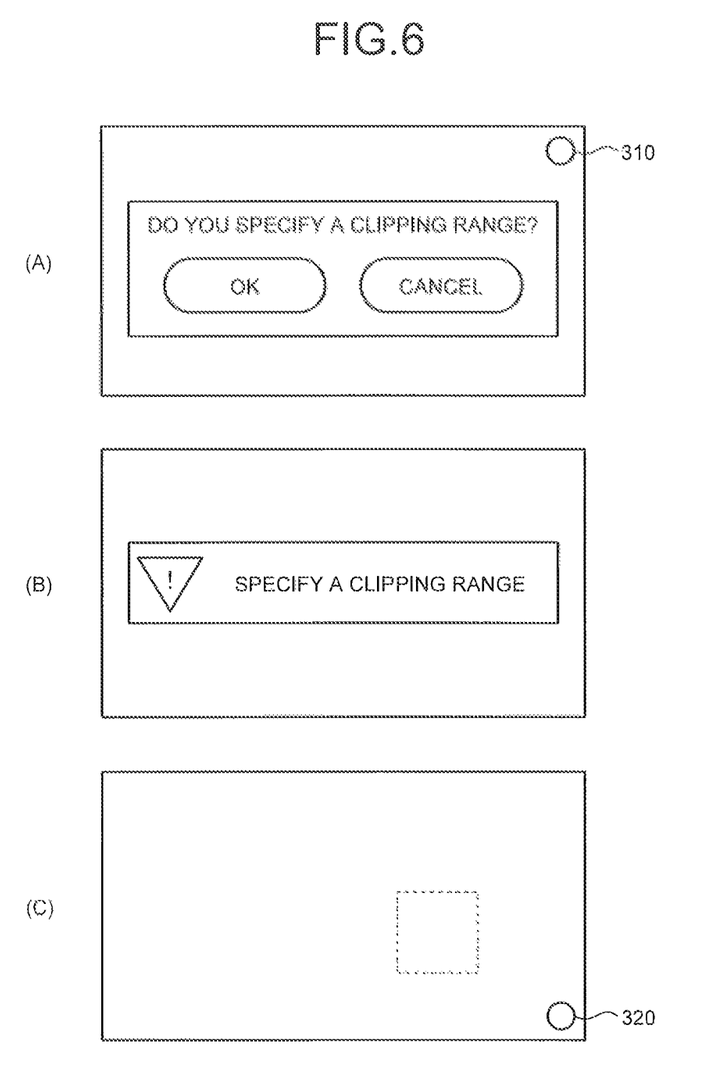
FIG. 6 is a diagram for explaining a method of specifying a clipping range of a projection image.

A method of specifying a clipping range of a projection image will be explained below with reference to FIG. 6. When accepting depression of a start icon 310 for instructing a start of specifying a clipping range, the projector 300 performs control to display a pop-up screen for checking a start of specifying the clipping range as illustrated in FIG. 6 (A). When accepting depression of "OK button" on the pop-up screen, the projector 300 performs control to display a message prompting the user to specify the clipping range as illustrated in FIG. 6 (B). Thereafter, the user can perform an operation of specifying the clipping range using the stylus pen 400, etc. Then, as illustrated in FIG. 6 (C), when accepting depression of an end icon 320 instructing an end of specifying the clipping range, the projector 300 transmits coordinate information indicating coordinates of a specified clipping range (a rectangle surrounded by dotted line in the example of FIG. 6) on the projection plane to the conference terminal 2. The conference terminal 2 performs control to transmit the range information received from the projector 300 to other conference terminal 2 as the other party in the meeting.

Figure 7:
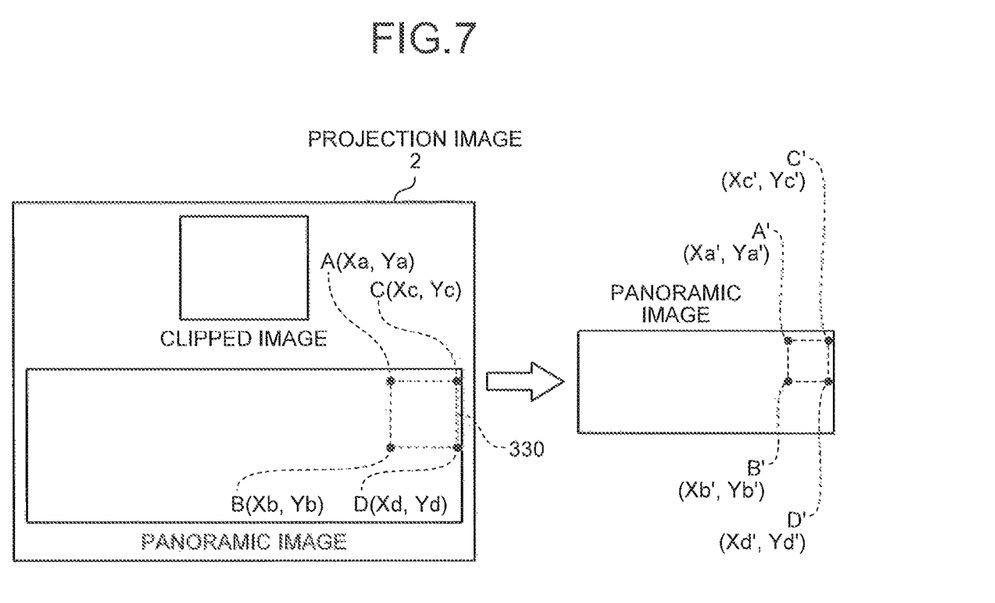
FIG. 7 is a diagram illustrating an example of specifying a clipping range.

As illustrated in FIG. 7, it is assumed a case where an area 330 is specified as a clipping range, in which the person H is reflected, in the projection image 2 (it can be considered as an area in the base 2 side-projection plane to which an image including the base 1 side-panoramic image is projected). In this example, the area 330 is a rectangular area, and coordinate information of the area 330 is information indicating respective coordinates of four vertices (A, B, C, D) of the area 330. In this example, the coordinates of the vertex A in the projection image 2 are (Xa, Ya), the coordinates of the vertex B are (Xb, Yb), the coordinates of the vertex C are (Xc, Yc), and the coordinates of the vertex D are (Xd, Yd). The coordinate information is transmitted to the base 1 side-conference terminal 2.

The base 1 side-conference terminal 2 generates output information including a clipped image obtained by clipping out an area, in the base 1 side-panoramic image, corresponding to the coordinate information received from the base 2 side-conference terminal 2 and including voice whose directivity is controlled according to the area, and transmits the generated output information to the base 2 side-conference terminal 2. In the example of FIG. 7, the base 1 side-conference terminal 2 clips out an image of a rectangular area, as a clipped image, surrounded by the coordinates (Xa', Ya') of vertex A', the coordinates (Xb', Yb') of vertex B', the coordinates (Xc', Yc') of vertex C', and the coordinates (Xd', Yd') of vertex D' in the panoramic image acquired from the panoramic camera 10 installed in the own device. The base 1 side-conference terminal 2 controls the directivity of the microphone array 12 so as to direct the directivity to a microphone provided at a position closest to the coordinates of the area corresponding to the coordinate information received from the base 2 side-conference terminal 2, in the panoramic image, based on the position information indicating a relationship between the position of the microphone included in the microphone array 12 and the coordinates in the panoramic image.

The base 1 side-conference terminal 2 then transmits the output information including the clipped image clipped in the above manner and the voice whose directivity is controlled to the base 2 side-conference terminal 2. The base 2 side-conference terminal 2 outputs the output information received from the base 1 side-conference terminal 2.

Here, each of the conference terminals 2 (the base 1 side-conference terminal 2 and the base 2 side-conference terminal 2) according to the present embodiment previously stores first correspondence information indicating a correspondence relation between the coordinates of a basic area indicating an area predetermined as an area, of the projection plane provided in a base where the conference terminal 2 is placed, to which an image is projected by the projector 300 connected to the conference terminal 2 and the coordinates of the panoramic image. The basic area represents an area of the projection plane, when the projector 300 set to previously designed position and attitude projects an image, to which the image is assumed to be projected. For example, when the projector 300 is to be used and if the position and the attitude are different from the previously set position and attitude, the size of an area (in the following description, it may be called "projection area"), of the projection plane, to which an image is actually projected becomes different from the size of the basic area, and therefore, there is a problem that a correspondence relation between the coordinates of the projection area and the coordinates of the captured image cannot be accurately represented by the first correspondence information.

Therefore, the conference terminal 2 according to the present embodiment generates second correspondence information indicating a correspondence relation between the coordinates of the projection area and the coordinates of the captured image based on the size of the projection area indicating the area, of the projection plane, to which the image is actually projected by the projector 300, the size of the basic area, and based on the first correspondence information. Thus, it is possible to accurately represent the correspondence relation between the coordinates of the projection area and the coordinates of the captured image regardless of the position and the attitude of the projector 300 in use. More specific contents thereof will be explained later.

Figure 8:
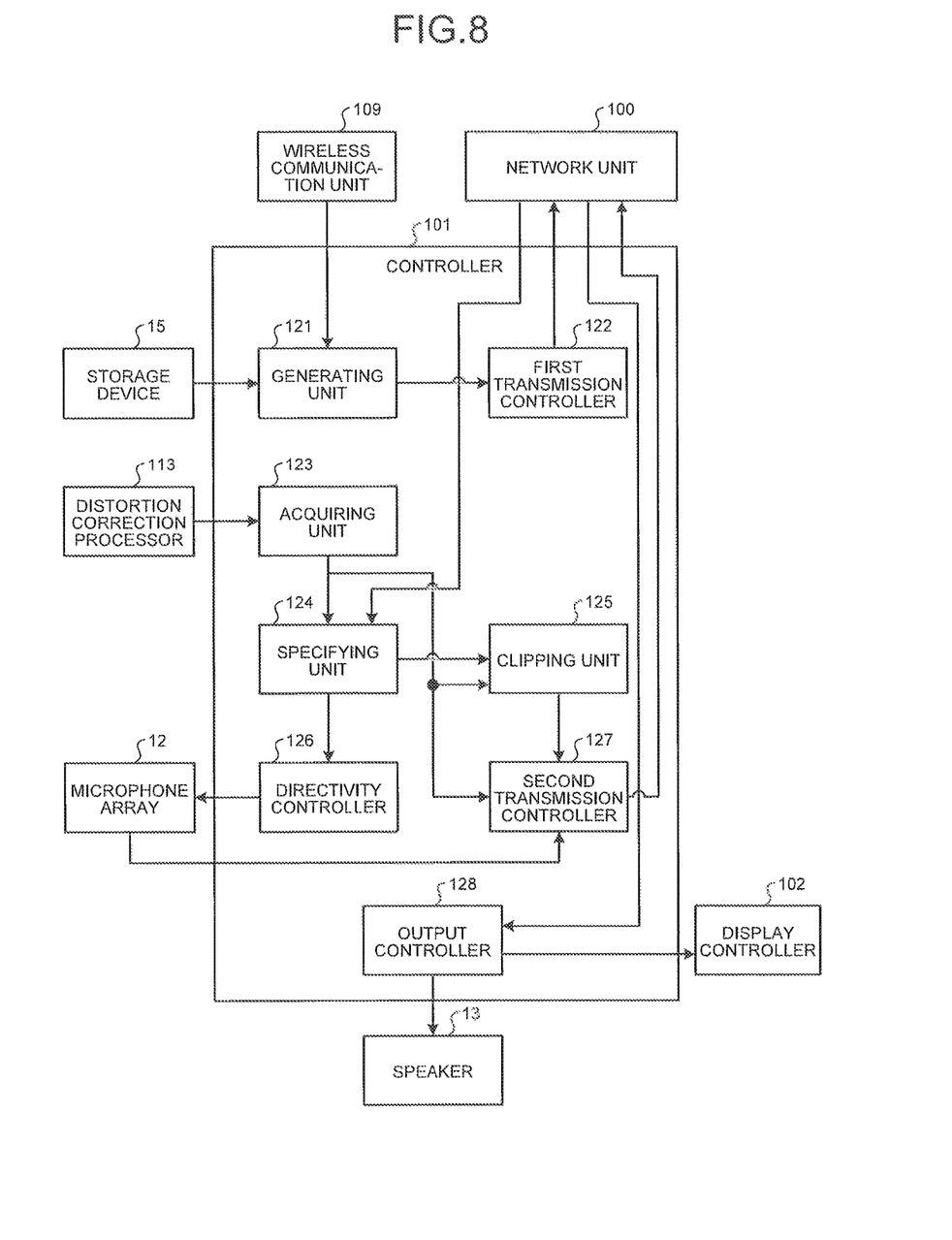
FIG. 8 is a diagram illustrating an example of functions provided in a controller of the conference terminal.

FIG. 8 is a diagram illustrating an example of functions provided in the controller 101 of the conference terminal 2. For the sake of simple description, the functions related to the present embodiment are mainly exemplified in FIG. 8. However, the functions of the controller 101 are not limited thereto.

As illustrated in FIG. 8, the controller 101 includes a generating unit 121, a first transmission controller 122, an acquiring unit 123, a specifying unit 124, a clipping unit 125, a directivity controller 126, a second transmission controller 127, and an output controller 128.

The generating unit 121 generates the second correspondence information indicating a correspondence relation between the coordinates of the projection area and the coordinates of the captured image based on the size of the projection area indicating the area, of the projection plane, to which the image is actually projected by the projector 300 connected to the own device, the size of the basic area indicating an area predetermined as an area, of the projection plane, to which an image is projected by the projector 300 connected to the own device, and based on the first correspondence information. More specifically, the generating unit 121 performs a scale factor conversion according to the difference between the size of the basic area and the size of the projection area to derive coordinates of the panoramic image corresponding to each coordinates of the projection area, and generates the second correspondence information.

In the present embodiment, the generating unit 121 specifies a projection area according to an operation of the user. More specifically, the generating unit 121 specifies the projection area of the projection plane, based on the positions corresponding to the four vertices of the projection area indicated by the user. In this example, the generating unit 121 acquires information indicating a position, of the projection plane, pointed by a pointing device, as information representing the position indicated by the user, from the pointing device (herein, dedicated stylus pen 400) used by the user indicating a position on the projection plane.

Figure 9:
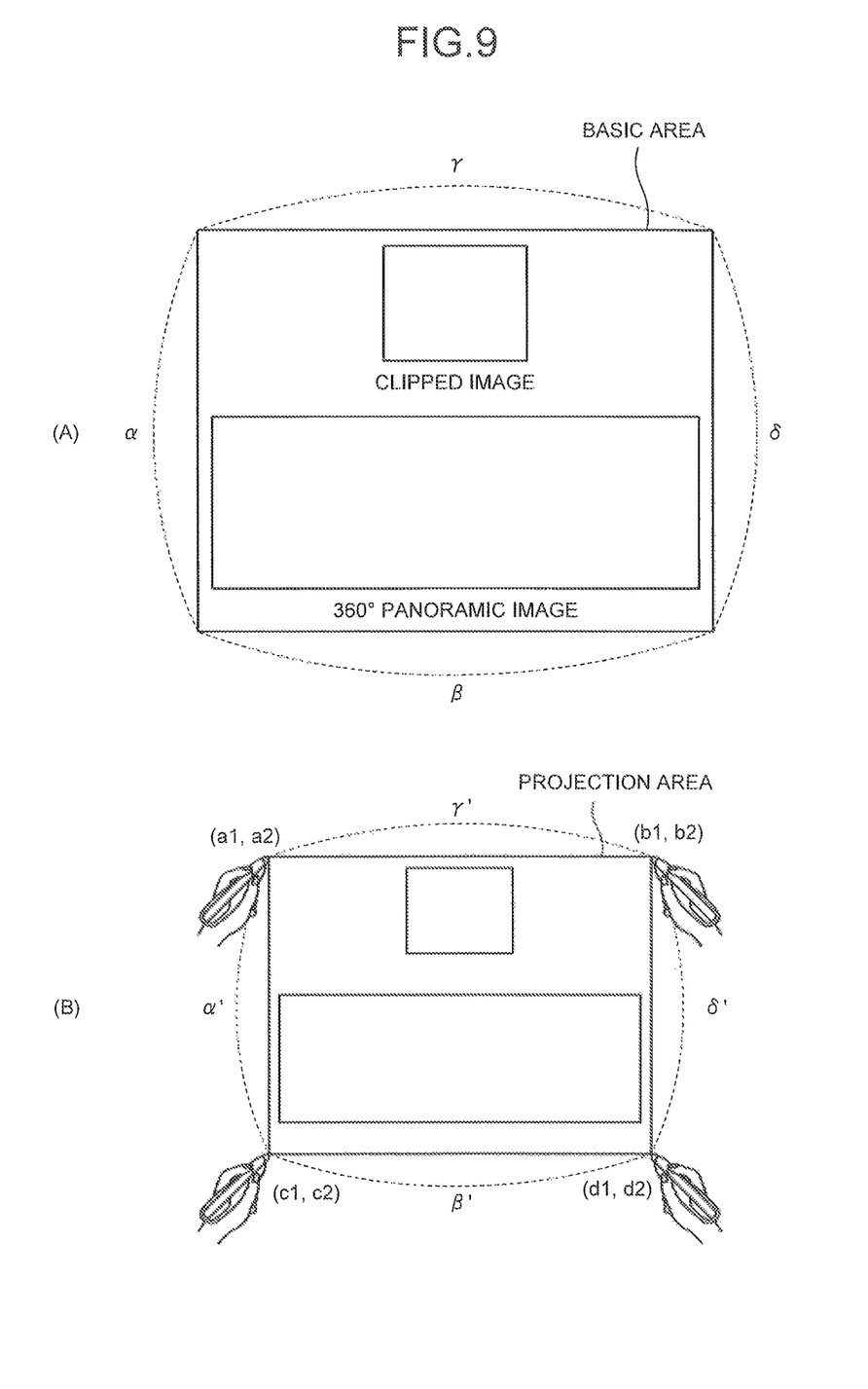
FIG. 9 is a diagram for explaining calibration of a correspondence relation between a projection image and a captured image.

For example, as illustrated in FIGS. 9 (A) and 9 (B), it is assumed a case where the basic area and the projection area are different from each other. In the present embodiment, similarly to an icon to specify the clipping range, when accepting the depression of the icon to instruct execution of calibration of a correspondence relation between the projection image and the captured image on the image (projection image) projected to the projection plane, the generating unit 121 enters a calibration mode, and performs control to output information (it may be video or voice) for prompting the user to indicate four vertices of a rectangular projection image (projection area). As illustrated in FIG. 9 (B), the user sequentially points (indicates) the four vertices of the projection image using the dedicated stylus pen 400 according to the specified order. Accordingly, the generating unit 121 can check the coordinates of the four vertices of the projection area, thus checking a length ($\alpha'$) of the left side, a length ($\beta'$) of the bottom side, a length ($\gamma'$) of the upper side, and a length ($\delta'$) of the right side. Because a length ($\alpha$) of the left side, a length ($\beta$) of the bottom side, a length ($\gamma$) of the upper side, and a length ($\delta$) of the right side of the basic area are known in advance, a difference in scale for each of the four sides such as $\alpha/\alpha'$, $\beta/\beta'$, $\gamma/\gamma'$, and $\delta/\delta'$ can be recognized. The generating unit 121 uses these values (each value indicating a difference in scale for each of the four sides) to perform the scale factor conversion of the first correspondence information, so that it is possible to derive the panoramic image corresponding to the coordinates of the projection area. Thus, the second correspondence information indicating a correspondence relation between the coordinates of the projection area and the coordinates of the captured image can be generated.

Returning to FIG. 8, the description will be continued. The first transmission controller 122 performs control to transmit the coordinate information indicating the range specified by the user (range specified as a clipping range), in the projection area, and the second correspondence information to other conference terminal 2 as the other party in the meeting (hereinafter, it may be called "other conference terminal 2").

The acquiring unit 123 acquires a panoramic image captured by the panoramic camera 10 for capturing the surrounding of the own device. In this example, the acquiring unit 123 acquires a corrected panoramic image input from the distortion correction processor 113.

When receiving the coordinate information indicating the range (clipping range) specified by the user of other conference terminal 2, in the projection area on the projection plane in the base where the other conference terminal 2 is placed, and the second correspondence information generated by the other conference terminal 2 from the other conference terminal 2, the specifying unit 124 specifies the area corresponding to the received coordinate information in the captured image acquired by the acquiring unit 123 based on the received coordinate information and second correspondence information.

The clipping unit 125 clips out an image of the area specified by the specifying unit 124, of the panoramic image acquired by the acquiring unit 123, as a clipped image.

The directivity controller 126 controls the directivity of the microphone array 12 so as to direct the directivity to a microphone corresponding to the area (the area within the panoramic image in this example) specified by the specifying unit 124 among the microphones separately installed in the conference terminal 2. The directivity controller 126 can determine the microphone corresponding to the coordinates of the area specified by the specifying unit 124 based on the position information indicating a relationship between the position of the microphone included in the microphone array 12 and the coordinates of the panoramic image. The position information may be stored in, for example, the storage device 15.

The second transmission controller 127 performs control to transmit the output information including at least voice whose directivity is controlled by the directivity controller 126 to other conference terminal 2. In the present embodiment, the second transmission controller 127 performs control to transmit the output information including the voice whose directivity is controlled by the directivity controller 126 and the clipped image clipped by the clipping unit 125 to the other conference terminal 2. More specifically, the second transmission controller 127 performs control to transmit the output information including the panoramic image acquired by the acquiring unit 123, the voice whose directivity is controlled by the directivity controller 126, and the clipped image clipped by the clipping unit 125 to the other conference terminal 2. The output information should be a form including at least the voice whose directivity is controlled by the directivity controller 126 (the voice whose directivity is controlled according to the area, corresponding to the coordinate information received from the other conference terminal 2, in the captured image acquired by the acquiring unit 123). For example, it can be a form in which the clipping unit 125 is not provided.

When not receiving the coordinate information and the second correspondence information from the other conference terminal 2, the second transmission controller 127 performs control to transmit normal meeting information, including the panoramic image acquired by the acquiring unit 123, the clipped image obtained by clipping and enlarging a speaker among the meeting participants reflected in the panoramic image, and voice data collected by the microphone array 12, to the other conference terminal 2.

The output controller 128 performs control to output the image and the voice received from the other conference terminal 2. The output controller 128 performs control to instruct the display controller 102 to output the image received from the other conference terminal 2 through the projector 300 (projection to the projection plane), and to output the voice received from the other conference terminal 2 through the speaker 13. When receiving the output information from the other conference terminal 2, the output controller 128 according to the present embodiment performs control to output the received output information. More specifically, the output controller 128 performs control to instruct the display controller 102 to output the clipped image and the image synthesized from the panoramic images included in the received output information and to output the voice included in the received output information through the speaker 13. When receiving the normal meeting information from other conference terminal 2, the output controller 128 performs control to output the received normal meeting information.

The functions provided in the controller 101 as explained above (the generating unit 121, the first transmission controller 122, the acquiring unit 123, the specifying unit 124, the clipping unit 125, the directivity controller 126, the second transmission controller 127, and the output controller 128) may be implemented by the CPU 14 executing the program stored in the storage device 15 or the like, or at least part of the functions provided in the controller 101 may be implemented by a dedicated hardware circuit (semiconductor integrated circuit etc.).

In the examples, the panoramic camera 10 and the speaker 13 are included in the conference terminal 2, however, the configuration is not limited thereto, and these devices may be provided, for example, outside the conference terminal 2.

Figure 10:
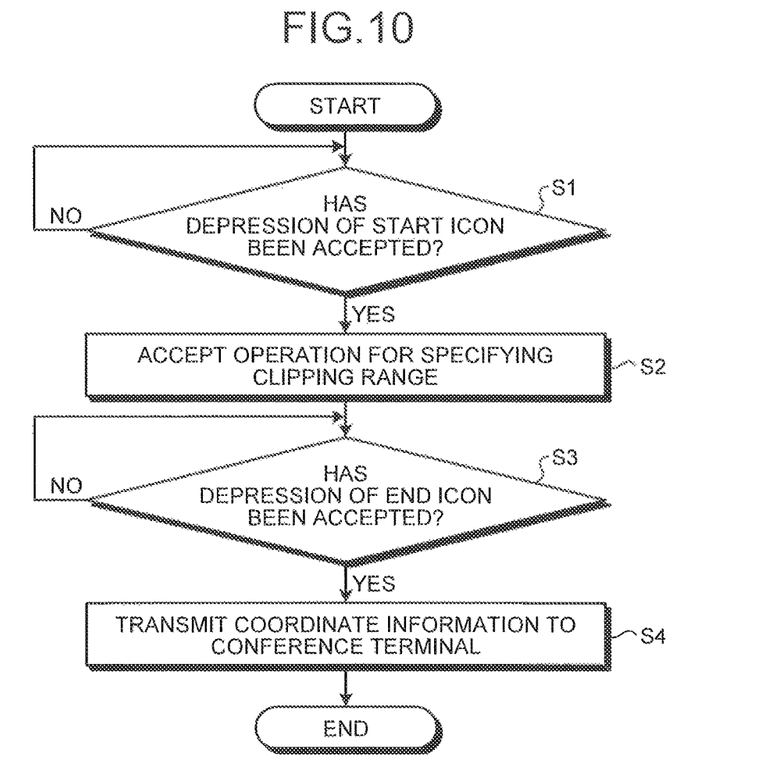
FIG. 10 is a flowchart illustrating an operation example of a projector.

FIG. 10 is a flowchart illustrating an operation example of the projector 300 when a clipping range is specified. When accepting the depression of the start icon 310 (Yes at Step S1), the projector 300 accepts an operation of specifying the clipping range (Step S2). When accepting the depression of the end icon 320 (Yes at Step S3), the projector 300 transmits coordinate information indicating the coordinates of the specified clipping range to the conference terminal 2 (Step S4).

Figure 11:
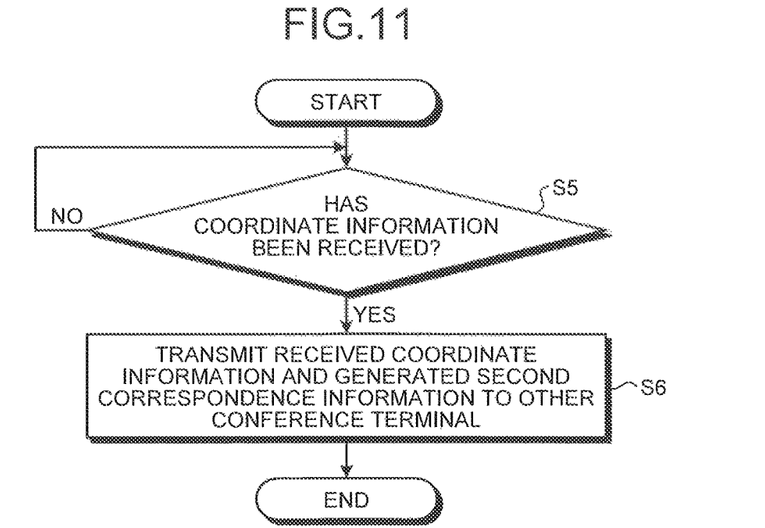
FIG. 11 is a flowchart illustrating an operation example of the conference terminal.

FIG. 11 is a flowchart illustrating an operation example of the conference terminal 2 when receiving coordinate information from the projector 300 connected to the own device. When receiving the coordinate information (Yes at Step S5), the first transmission controller 122 performs control to transmit the received coordinate information and the second correspondence information having been generated in the calibration mode in advance to the other conference terminal 2 (Step S6).

Figure 12:
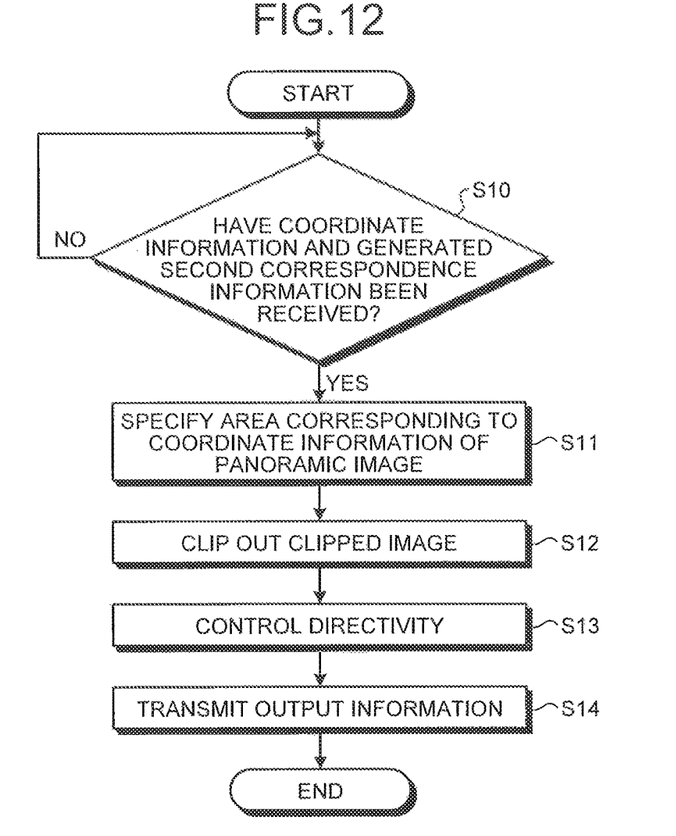
FIG. 12 is a flowchart illustrating an operation example of the conference terminal.

FIG. 12 is a flowchart illustrating an operation example of the conference terminal 2 when receiving the coordinate information and the second correspondence information from other conference terminal 2. When receiving the coordinate information and the second correspondence information from the other conference terminal 2 (Yes at Step S10), the specifying unit 124 specifies an area corresponding to the received coordinate information in the panoramic image (panoramic image captured from the panoramic camera 10 of the own device) acquired by the acquiring unit 123, based on the received coordinate information and second correspondence information (Step S11). Subsequently, the clipping unit 125 clips out the image of the area corresponding to the area specified at Step S11, in the panoramic image acquired by the acquiring unit 12, as a clipped image (Step S12). The directivity controller 126 controls the directivity of the microphone array 12 so as to direct the directivity to a microphone corresponding to the area specified at Step S11 among the microphones separately installed in the conference terminal 2 (Step S13). The second transmission controller 127 performs control to transmit the output information including the panoramic image acquired by the acquiring unit 123, the clipped image clipped at Step S12, and the voice whose directivity is controlled as a result of Step S13 to the other conference terminal 2 (Step S14).

Figure 13:
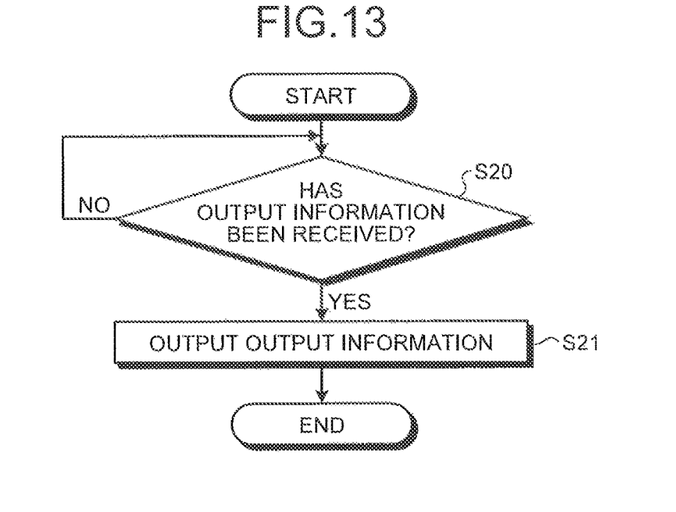
FIG. 13 is a flowchart illustrating an operation example of the conference terminal.

FIG. 13 is a flowchart illustrating an operation example of the conference terminal 2 when receiving output information from other conference terminal 2. When receiving the output information from other conference terminal 2 (Yes at Step S20), the output controller 128 performs control to output the received output information (Step S21).

As explained above, the conference terminal 2 according to the present embodiment specifies, when receiving the coordinate information and the second correspondence information from other conference terminal 2 as the other party in the meeting, an area corresponding to the received coordinate information in the panoramic image acquired from the panoramic camera 10 of the own device, based on the received coordinate information and second correspondence information, and clips out the image of the specified area as a clipped image. The conference terminal 2 controls the directivity of the microphone array 12 so as to direct the directivity to a microphone corresponding to the specified area among the microphones separately installed in the conference terminal 2. The conference terminal 2 transmits the output information including the clipped image and the voice whose directivity is controlled to other conference terminal 2, and the other conference terminal 2 outputs the received output information. Thus, the other conference terminal 2 can perform an intended output. In the present embodiment, the range of a capturing area is set to 360 degrees around the panoramic camera. However, the gist of the present embodiment is to specify part of the captured image as a clipped image and to control the directivity of a microphone corresponding to the clipped image. Therefore, as the capturing area, the angle of view of the camera may be below 360 degrees, for example, about 80 degrees.

It may be configured so that the programs executed by the conference terminal 2 are provided by being recorded in a computer-readable recording medium such as a compact disk read only memory (CD-ROM), a flexible disk (FD), a compact disk recordable (CD-R), a digital versatile disk (DVD), Universal Serial Bus (USB) in a file of an installable format or of an executable format, or may be configured so that the programs are provided or distributed via a network such as the Internet. It may also be configured so that the programs are provided by being preinstalled into a ROM or the like.

According to the present embodiments, it is possible to provide the communication system, the communication device, the communication method, and the program capable of performing an intended output.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A communication system comprising:
a first communication device, and a second communication device configured to transmit and receive data to and from the first communication device, wherein
the first communication device is configured to include:
a generating unit configured to generate second correspondence information indicating a correspondence relation between coordinates of a projection area and coordinates of a captured image captured by an imaging unit of the second communication device,
the generating unit generating the second correspondence information based on first correspondence information (a) indicating a size of the projection area indicating an area of a projection plane, to which an image is actually projected by an image projection device connected to the first communication device, (b) indicating a size of a basic area of the projection plane, indicating an area predetermined as the area to which the image is to be projected, and (c) indicating a correspondence relation between coordinates of the basic area and the coordinates of the captured image obtained through capturing by the imaging unit of the second communication device;
a first transmission controller configured to perform control to transmit (i) coordinate information indicating a range of the projection area, said range having been specified by a user, and (ii) the second correspondence information, to the second communication device; and
an output controller configured to perform control to output, when the first communication device receives from the second communication device output information including voice whose directivity is controlled according to an area corresponding to coordinate information indicating the coordinates of the captured image, the received output information, and the second communication device is configured to include:
the imaging unit configured to capture surrounding of the second communication device:
an acquiring unit configured to acquire the captured image obtained through capturing by the imaging unit;
a specifying unit configured to specify, when the second communication device receives the coordinate information and the second correspondence information from the first communication device, the area corresponding to the coordinate information of the captured image acquired by the acquiring unit, based on the received coordinate information and the second correspondence information;
a directivity controller configured to control a directivity of a microphone array including a plurality of microphones so as to direct the directivity to a microphone corresponding to the area specified by the specifying unit among the microphones installed in the second communication device; and
a second transmission controller configured to perform control to transmit the output information including at least voice whose directivity is controlled by the directivity controller to the first communication device.

2. The communication system according to claim 1, wherein
the second communication device is configured to further include a clipping unit configured to clip an image of the area of the captured image acquired by the acquiring unit, specified by the specifying unit, and
the second transmission controller is configured to perform control to transmit the output information including the clipped image clipped by the clipping unit and the voice whose directivity is controlled by the directivity controller to the first communication device.

3. The communication system according to claim 1, wherein
the generating unit is configured to perform scale factor conversion according to a difference between the size of the basic area and the size of the projection area to derive coordinates of the captured image corresponding to each coordinates of the projection area, and to generate the second correspondence information.

4. The communication system according to claim 1, wherein the generating unit is configured to specify the projection area according to an operation of the user.

5. The communication system according to claim 4, wherein the generating unit is configured to specify the projection area of the projection plane, based on positions corresponding to four vertices of the projection area indicated by the user.

6. The communication system according to claim 5, wherein the generating unit is configured to acquire information indicating a position of the projection plane, pointed by a pointing device from the pointing device used by the user to indicate a position on the projection plane, as information representing a position indicated by the user.

7. A communication device comprising:
a generating unit configured to generate second correspondence information indicating a correspondence relation between coordinates of a projection area and coordinates of a captured image, the second correspondence information generated based on first correspondence information (a) indicating a size of the projection area indicating an area of a projection plane, to which an image is actually projected by an image projection device connected to the communication device, (b) indicating a size of a basic area of the projection plane, indicating an area predetermined as the area to which the image is projected, and (c) indicating a correspondence relation between the coordinates of the basic area and the coordinates of the captured image obtained through capturing by an imaging unit;

a transmission controller configured to perform control to transmit (i) coordinate information indicating a range of the projection area, said range having been specified by a user, and (ii) the second correspondence information, to another communication device configured to communicate with the communication device; and an output controller configured to perform control to output, when receiving from said another communication device output information including voice whose directivity is controlled according to an area corresponding to coordinate information of the captured image indicating the coordinates of the captured image, the received output information.

8. A communication method performed by a communication system configured to include a first communication device, and a second communication device configured to transmit and receive data to and from the first communication device, the communication method comprising:

in the first communication device,
(a) generating second correspondence information indicating a correspondence relation between coordinates of a projection area and coordinates of a captured image captured by an imaging unit of the second communication device, the second correspondence information being generated based on first correspondence information (i) indicating a size of the projection area indicating an area of a projection plane, to which an image is actually projected by an image projection device connected to the first communication device, (ii) indicating a size of a basic area of the projection plane, indicating an area predetermined as the area to which the image is projected, and (iii) indicating a correspondence relation between coordinates of the basic area and the coordinates of the captured image obtained through capturing by the imaging unit of the second communication device;
(b) performing control to transmit coordinate information indicating a range of the projection area, said range having been specified by a user and the second correspondence information to the second communication device; and
(c) performing control to output, when receiving from the second communication device output information including voice whose directivity is controlled according to an area corresponding to coordinate information of the captured image indicating the coordinates of the captured image, the received output information, and in the second communication device,
(d) acquiring the captured image obtained through capturing by the imaging unit configured to capture surrounding of the second communication device;
(e) specifying, when receiving the coordinate information and the second correspondence information from the first communication device, the area corresponding to the coordinate information of the captured image acquired at the acquiring in (d) based on the received coordinate information and the second correspondence information;
(f) controlling a directivity of a microphone array including a plurality of microphones so as to direct the directivity to a microphone corresponding to the area specified at the specifying in (e) among the microphones installed in the second communication device; and
(g) performing control to transmit the output information including the voice whose directivity is controlled at the controlling in (f) to the first communication device.

9. A communication method performed by a communication device comprising:

generating second correspondence information indicating a correspondence relation between coordinates of a projection area and coordinates of a captured image, the second correspondence information being generated based on first correspondence information (a) indicating a size of the projection area indicating an area of a projection plane, to which an image is actually projected by an image projection device connected to the communication device, (b) indicating a size of a basic area of the projection plane, indicating an area predetermined as the area to which the image is projected, and (c) indicating a correspondence relation between the coordinates of the basic area and the coordinates of the captured image obtained through capturing by an imaging unit;

performing control to transmit coordinate information indicating a range of the projection area, said range having been specified by a user, and the second correspondence information, to another communication device configured to communicate with the communication device; and performing control to output, when receiving from said another communication device output information including voice whose directivity is controlled according to an area corresponding to coordinate information of the captured image indicating the coordinates of the captured image, the received output information.

* * * * *